US009218501B2

(12) United States Patent
Maheshwari et al.

(10) Patent No.: US 9,218,501 B2
(45) Date of Patent: Dec. 22, 2015

(54) SECURE ACCESS MANAGEMENT AGAINST VOLATILE IDENTITY STORES

(75) Inventors: Harsh Maheshwari, Birlagram (IN); Niharika Sharma, Pilani (IN)

(73) Assignee: Oracle International Corporation, Redwood Shores, CA (US)

( * ) Notice: Subject to any disclaimer, the term of this patent is extended or adjusted under 35 U.S.C. 154(b) by 514 days.

(21) Appl. No.: 12/852,383

(22) Filed: Aug. 6, 2010

(65) Prior Publication Data
US 2012/0036558 A1 Feb. 9, 2012

(51) Int. Cl.
G06F 7/04 (2006.01)
H04L 29/06 (2006.01)
G06F 21/62 (2013.01)

(52) U.S. Cl.
CPC ................................. G06F 21/6218 (2013.01)

(58) Field of Classification Search
CPC ... G06F 21/60; G06F 21/604; G06F 21/6209; H04L 9/3268; H04L 9/3294; H04L 63/101; H04L 63/102; H04L 63/105; H04L 63/107; H04L 63/108
USPC ........ 707/781–788; 713/165–167; 726/26–28
See application file for complete search history.

(56) References Cited

U.S. PATENT DOCUMENTS

| 6,460,141 | B1 | 10/2002 | Olden |
| 6,950,943 | B1 * | 9/2005 | Bacha et al. ..................... 726/21 |
| 7,380,279 | B2 * | 5/2008 | Prokupets et al. .............. 726/27 |
| 7,480,651 | B1 | 1/2009 | Matthiesen et al. |
| 7,571,180 | B2 | 8/2009 | Minyailov |
| 8,032,558 | B2 * | 10/2011 | Carter et al. ................... 707/786 |
| 8,156,224 | B2 * | 4/2012 | De Oca et al. ................ 709/225 |
| 8,255,357 | B1 * | 8/2012 | Heimbach et al. ............. 707/609 |
| 8,321,949 | B1 * | 11/2012 | Green et al. .................... 726/26 |
| 8,458,805 | B2 * | 6/2013 | Adelstein et al. ............... 726/27 |
| 8,539,555 | B2 * | 9/2013 | Jerichow et al. ................. 726/4 |
| 2004/0064571 | A1 * | 4/2004 | Nuuttila ........................ 709/229 |
| 2004/0064691 | A1 * | 4/2004 | Lu et al. ........................ 713/158 |
| 2004/0193653 | A1 * | 9/2004 | Howard et al. ................ 707/200 |
| 2006/0112107 | A1 * | 5/2006 | Jones ............................... 707/10 |
| 2006/0218394 | A1 * | 9/2006 | Yang ............................. 713/167 |
| 2006/0265760 | A1 * | 11/2006 | Daemke et al. ................. 726/27 |
| 2007/0027986 | A1 | 2/2007 | Joshi et al. |

(Continued)

OTHER PUBLICATIONS

"Identity and Access Management"; 2010, http://www.novell.com/solutions/identity-and-access, 4 pages.

(Continued)

*Primary Examiner* — Dede Zecher
*Assistant Examiner* — Abdullah Almamun
(74) *Attorney, Agent, or Firm* — Kilpatrick Townsend & Stockton LLP

(57) ABSTRACT

Embodiments of the present invention are directed to managing access to protected computer resources. More particularly, embodiments of the present invention provide systems and methods for modifying a user's ability to access a protected computer resource while the user is currently using the resource. If the privileges granted to a user for accessing the protected resource are altered, these alterations take effect in substantially real time. In an exemplary embodiment, a user data repository will initiate the process of altering the user's access privileges upon changes of data in the repository. In this way, it does not matter how or by whom the data in the repository is changed, but the change itself is sufficient to initiate a re-computation of a user's access privileges to the protected resource.

20 Claims, 7 Drawing Sheets

(56) References Cited

U.S. PATENT DOCUMENTS

| | | | |
|---|---|---|---|
| 2008/0059633 A1 | 3/2008 | Hu | |
| 2008/0168528 A1 | 7/2008 | Lin et al. | |
| 2008/0263543 A1* | 10/2008 | Ramachandran | 717/177 |
| 2009/0100529 A1* | 4/2009 | Livnat et al. | 726/28 |
| 2010/0094991 A1* | 4/2010 | Parikh et al. | 709/224 |
| 2010/0114967 A1* | 5/2010 | Yaniv et al. | 707/785 |
| 2010/0198787 A1* | 8/2010 | Robertson et al. | 707/634 |
| 2010/0211989 A1* | 8/2010 | Julisch et al. | 726/1 |
| 2010/0217779 A1* | 8/2010 | Crim et al. | 707/784 |
| 2010/0262448 A1* | 10/2010 | Mohanty et al. | 705/7 |
| 2010/0262624 A1* | 10/2010 | Pullikottil | 707/783 |
| 2010/0268824 A1* | 10/2010 | Tanner et al. | 709/225 |

OTHER PUBLICATIONS

"Identity and Access Management Features"; 2010, http://identity-manager.hitachi-id.com/overview/features.com, 1 page.

"Sun Identity Management: Delivering simple, open, and proven solutions"; 2009, Sun Microsystems, 6 pages.

"Identity and Access Management"; 2010, http://www-01.ibm.com/software/tivoli/solutions/identity-mgmt/, 2 pages.

"Product Brief: CA Identity Manager"; 2008, 6 pages.

"Business-Driven, Compliant Identity Management: Using SAP NetWeaver® Identity Management"; 2009, 12 pages.

* cited by examiner

SECURE ACCESS MANAGEMENT AGAINST VOLATILE IDENTITY STORES

BACKGROUND OF THE INVENTION

1. Field of the Invention

The present invention is in the field of systems for managing access to protected computing resources. In particular, the present invention provides a system and method for ensuring that if a user's authorized level of access to a protected resource changes while the user is using the resource, the change will be imposed on the user in substantially real time.

2. Description of the Related Art

Identity management, access management, and shared data repositories are known in the art. There are suppliers in the field, such as Oracle of Redwood Shores, Calif., that provide products for each of these functions. Other suppliers may also provide products for one or more of these functions. An enterprise can often choose solutions from a single vendor or can mix and match products from multiple vendors in order to obtain a custom solution.

In general, an identity management solution provides a unified, integrated platform to manage user identities, provision resources to users, secure access to resources, including computer resources, and support compliance processes. In a simple implementation, identity management may comprise a simple directory of all users in an organization. Additional features are provisioned as needed. For example, the directory can be expanded to include a list of protected resources to which a user should be granted access. A protected resource may be a computing system to which not everyone should be given access. For example, access to an organizations payroll system should be limited to select users.

Identity management systems can help facilitate the management of user privileges. For example, all employees in the human resources department of an organization may only need read access to payroll systems. An identity management system may store a record for each employee in the human resources department, and indicate that they should have read only access. In a somewhat more refined approach, rather than storing privileges assigned to each user individually, each user may be assigned one or more roles and the roles themselves can determine the privileges granted. Continuing with the above example, each employee of the human resources department could be assigned to the role "HR Employee" and then the "HR Employee" role could be assigned the privilege of read only access to the payroll system. A second role of "HR Manager" could be defined, and the privilege of write access could be assigned to the "HR Manager" role.

In this way, managing privileges assigned to each user becomes less complicated. For example, if a new system is added, and human resources employees need access to the new system, it is simply a matter of changing the privileges granted to the "HR Employee" role, without having to update each individual employee. Likewise, if an HR employee is promoted to manager, the employee can simply have the "HR Manager" role added to his record. The newly promoted employee will then be granted all the privileges that go along with being a "HR Manager" without having to individually add each of those privileges.

Shared data repositories, such as databases are also known. Shared databases can be accessed by any number of different applications and different users. Databases come in many forms. A database can be as simple as a flat file or more complex, such as a relational database. Centralizing storage of data that is important to an organization in a database provides many benefits. One benefit is that the data can be more secure, as there is a single repository that is responsible for maintaining the data. Another benefit is that central storage of the data can facilitate data sharing among different applications. For example, the identity management system discussed above can store the roles and privileges of each user in a database. An access management system can then use those roles to restrict access to protected systems, as will be further explained below.

Access management systems, as the name implies, are used to manage access to systems. As described above, an enterprise may have a payroll system. Some employees may need one level of access, such as read only access, to the system. Others may need a greater degree of access. Access to the system may be completely prohibited for yet another group of users. An access gate may be associated with a protected resource. Any attempt to access the protected resource may first be intercepted by the access gate. The access gate may then notify an access management system about the attempted access and provide identification of the user that is attempting to access to the protected resource. The access management system may then query the shared data repository to determine which privileges should be granted to the user. If the privileges previously populated in the data repository by the identity management system indicate the user should be given access to the protected resource, this information can be sent from the access manager back to the access gate. The access gate can then allow the user to access the protected resource at the level of access as determined by the access manager, data repository, and identity management system.

Because each piece of the solution described above may be provided by a different vendor, problems can arise due to a lack of coordination and cooperation between the pieces of the solution. For example, the access management system may grant a user access to a protected resource based on the role the user is assigned in the database. As the user is accessing the resource, the identity management system may later alter the role assigned to the user, such that the user should no longer be allowed access to the protected resource. Unfortunately, unless the identity management system notifies the access management system of this change, there is no way for the access management system to immediately revoke the user's access privileges. Because the identity management system and the access management system may be supplied by different vendors, there is no way to enforce proper notification of changes between the systems.

Access management systems have attempted to solve this problem by only granting users access to a protected resource for a finite period of time. For example, the access management system may grant a user a certificate that defines the user's access privileges to a protected resource and that certificate will expire in half an hour. After the certificate expires, the access management system repeats the process of granting access, thus the latest privileges are retrieved from the database and any changes made by the identity management system can be enforced.

Although monitoring changes through the expiration of a certificate is an improvement, it still leaves a large security gap. The time period between the change in a user's access privileges and the expiration of the certificate creates a security gap wherein the user may have access to a protected resource that he should not have. For example, an employee who is about to be terminated may currently be granted access to a highly sensitive system, such as an accounting system. The identity management system may lock the employee as part of the termination process, but until the employee's certificate expires, the access management system will be unaware that access to the accounting system for the user has been locked. A terminated employee having access to a protected resource for even a short period of time is clearly problematic.

There is therefore a problem in the art when dealing with identity and access management systems that may not be fully integrated, thus allowing security gaps to be created wherein users have privileges to access protected resources that are different than those that the users should have. There is a need for a solution to this problem that is independent of direct communication between identity management and access management systems. The solution should allow an access management system to limit access to protected resources in accordance with the access privileges that are stored in a database. Any changes to those access privileges should become effective as soon as possible without waiting for an independent event, such as the expiration of a certificate. Embodiments of the invention solve these and other problems, individually and collectively.

BRIEF SUMMARY OF THE INVENTION

Embodiments of the present invention are directed to managing access to protected computer resources. More particularly, embodiments of the present invention provide systems and methods for modifying a user's ability to access a protected computer resource while the user is currently granted access to the resource. If the privileges granted to a user for accessing the protected resource are altered, these alterations take effect in substantially real time. In an exemplary embodiment, a user data repository will initiate the process of altering the user's access privileges upon changes of data in the repository. In this way, it does not matter how or by whom the data in the repository is changed, but the change itself is sufficient to initiate a re-computation of a user's access privileges to the protected resource.

According to one embodiment, a method of managing user access to a protected resource is disclosed. The method comprises: receiving, at an access manager computer, an indication from a user data repository of a modification of data stored in said user data repository; calculating updated access privileges to said protected resource based on said modification; and updating an access gate with said updated access privileges, wherein said access gate limits access to said protected resource based on said updated access privileges. In one aspect, the method further comprises the modification of data stored includes a change in an assigned role of a user. In another aspect calculating updated access privileges includes calculating updated privileges based on the user's assigned role.

In yet another aspect, the updated privileges can include denying access to said protected resource. In a further aspect the indication from the user data repository is generated by a trigger in the user data repository. In yet another aspect the trigger is specified per user. In another aspect, the indication from the user data repository is generated by an LDAP persistent query. In a further aspect, the updated access privileges are calculated for all users upon any modification of said user data repository. In a different aspect, the updated access privileges are calculated only for users whose data is modified in said user data repository.

In yet another aspect, the method further comprises substantially real-time membership calculation and enforcement for a user whose data is modified in said user data repository. In another aspect, the method further comprises adding a user whose access to the protected resource has been locked to an invalid users list, wherein said list is verified upon every access to the protected resource. In another aspect, the method further comprises receiving an indication from an identity management application of a change in data stored in the user data repository. In yet one more aspect, the indication received at the access manager computer is generated by code executed by a relational database communicatively coupled to the access manager computer over a network in response to a change in data associated with a user record.

Other embodiments of the invention include computer systems comprising a processor, and a memory coupled to the processor, where the memory is configured to store a computer program that allows the processor to perform the methods described herein. And still additional embodiments of the invention are directed to non-transitory computer readable mediums storing thereon instructions which cause a computer to perform the methods described herein.

These and other embodiments of the invention along with many of its advantages and features are described in more detail in conjunction with the text below and the attached figures.

DETAILED DESCRIPTION OF THE INVENTION

Figure 1:
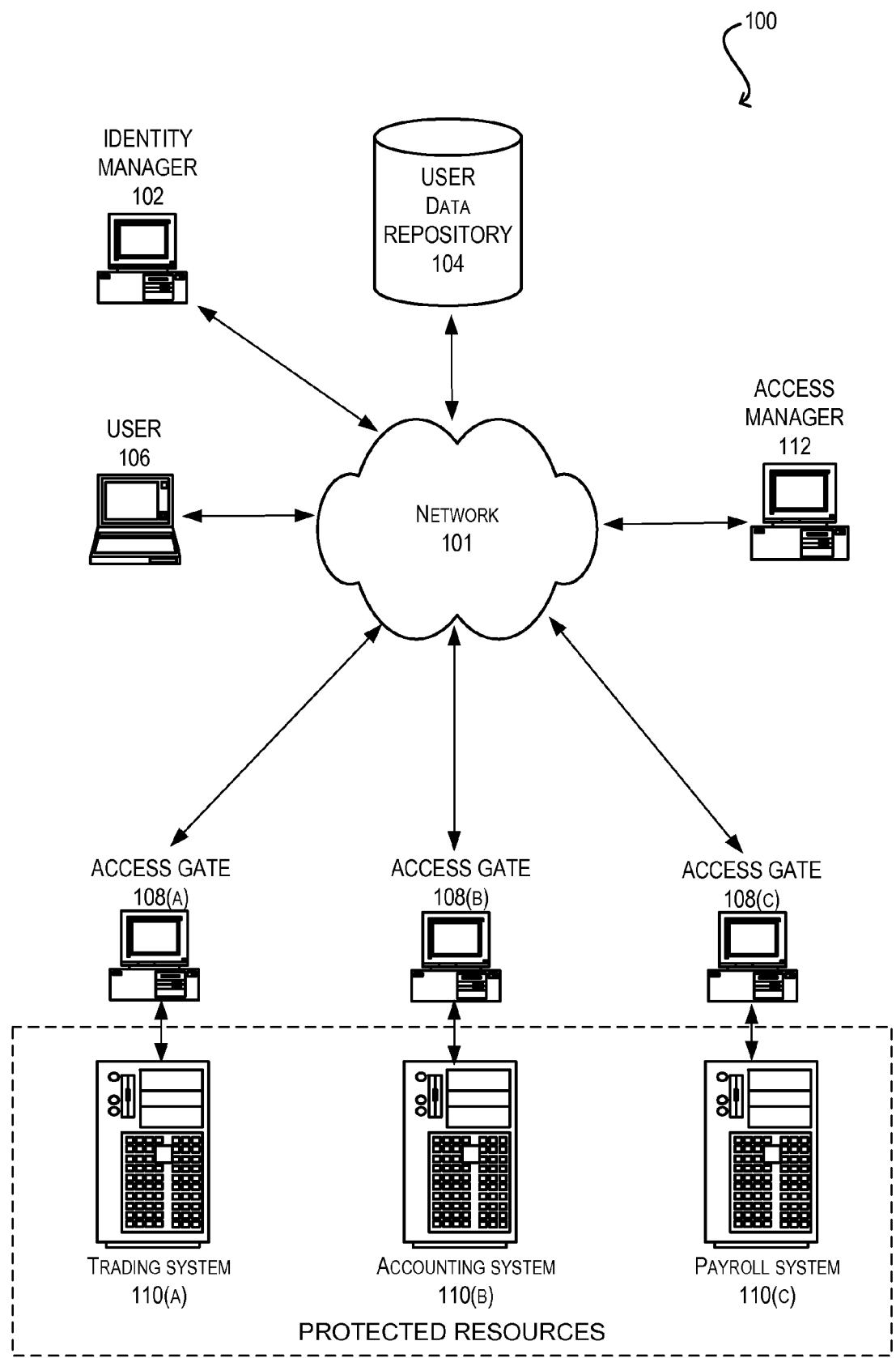
FIG. 1 is a simplified diagram illustrating a system according to an embodiment of the present invention.

FIG. 1 is a simplified diagram illustrating a system according to an embodiment of the present invention. The system 100 can have at its core a network 101. The network 101 can be any suitable computer network such as an intranet or the Internet. The particular technology of the network 101 is unimportant, except to the extent that the network 101 enables communications between all of the other elements depicted in FIG. 1. The system 100 can also include an Identity Manager 102. The Identity Manager 102 may be any system, computer, or application that is useful for managing the identities of the Users 106 of the system 100. The Identity Manager 102 is operable to allow administrators of system 100 to determine the level of access each user 106 will have to the Protected Resources 110(*a-c*) described below.

The Identity Manager 102 may provide the ability to define access privileges to the Protected Resources 110(*a-c*) on a per user basis. The Identity Manager 102 may also provide the ability to define access privileges on a per role basis, and then allow the Users 106 to be assigned to roles. The Identity Manager 102 is generally responsible for managing the access privileges of the Users 106 to the Protected Resources 110(*a-c*).

The Identity Manager 102 may store the privileges granted to each User 106 in a User Data Repository 104. The User Data Repository 104 can be any type of data store that is commonly available. In some embodiments, the User Data Repository 104 is a relational database, such as Oracle 9i offered by Oracle of Redwood Shores, Calif. Any other relational or non relational database would also be suitable. In some embodiments, the User Data Repository 104 provides the capability of executing code, such as stored procedures, upon the occurrence of certain changes in the User Data Repository 104. In general these stored procedures may be referred to as triggers. Various triggers may be established within the User Data Repository 104. For example, a trigger may be established on the record used to store data about each individual User 106. The trigger may be activated upon any alteration of the user's record. Similarly, triggers may be established on other data elements, such as the roles that are granted to Users 106, and the privileges granted to those roles. These triggers may be likewise activated on changes made to information related to roles stored within the User Data Repository 104.

As mentioned above, triggers are code that may be executed upon data updates in the User Data Repository 104. The code can perform functions such as sending messages to other elements within system 100. For example, the Identity Manager 102 may alter the access privileges of a User 106 and store this change in the User Data Repository 104. The change may cause a trigger to activate, which results in the execution of computer code to send a message to the Access Manager 112 notifying the Access Manager 112 of a change. The operation of the Access Manager 112 will be discussed in further detail below.

In an alternate embodiment, rather than a trigger, the User Data Repository 104 may implement a notification mechanism such as the Persistent Query as implemented in the Lightweight Directory Access Protocol (LDAP). LDAP Persistent Query is a mechanism whereby an element, such as the Access Manager 112, can request that the User Data Repository 104 notify the Access Manager 112 upon the occurrence of certain conditions. For example, the User Data Repository 104 can be configured to notify the Access Manager upon any change to a User 106 record in the User Data Repository 104.

Although two exemplary notification mechanisms, triggers and LDAP Persistent Query have been described, it should be understood that this is exemplary and not limiting. The particular mechanism used for notification is not material. What should be understood is that the User Data Repository 104 is configured to notify an external system upon changes to data stored within the repository. Any mechanism that can perform this function would be suitable.

The Access Gates 108(*a-c*) may be elements that are used to limit access to the Protected Resources 110(*a-b*). In some embodiments, the Access Gates 108(*a-c*) may be standalone computers, while in other embodiments, they may be integrated into the same machine that operates to provide the Protected Resources 110(*a-c*). In some embodiments, each of the Protected Resources 110(*a-c*) may execute on a standalone computer or computing system, while in other embodiments, multiple Protected Resources 110(*a-c*) may execute on a single computing system. In the present example, three exemplary Protected Resources 110(*a-c*), a trading system 110(*a*), an accounting system 110(*b*), and a payroll system 110(*c*), are depicted. Each one of these systems may have access restricted to a certain set of Users 106 who have been granted privileges to those systems. Although three Protected Resources 110(*a-c*) have been depicted, this is for purposes of explanation only, and is not limiting.

What should be understood is that each of the Protected Resource 110(*a-c*) is protected by an Access Gate 108(*a-c*). The Protected Resources 110(*a-c*) and the Access Gates 108(*a-c*) may run on a single computer, each element may run on a separate computer, or any combination thereof. As will be explained in further detail below, a User 106 attempting to access the Protected Resources 110(*a-c*) will first encounter the Access Gate 108(*a-c*) that is protecting that resource. The physical hardware that the Access Gate 108(*a-c*) is executing on is not of particular importance, but what should be understood is that access to the Protected Resources 110(*a-c*) is granted through the Access Gate 108(*a-c*).

Upon presentation of a User 106 that wishes to access a Protected Resource 110(*a-c*), the corresponding Access Gate 108(*a-c*) may communicate with the Access Manager 112. The Access Manager 112 is a system that determines which Users 106 are to be granted access to which resources. The Access Gates 108(*a-c*) may communicate with the Access Manager 112 and provide an identification of the User 106 that is attempting to access a Protected Resource 110(*a-c*), and the particular resource that is being accessed. The Access Manager 112 may then in turn query the User Data Repository 104 to determine the privileges that have been granted to the User 106. For example, privileges that have been granted through the Identity Manager 102. If the Access Manager 112 determines that a User 106 should be given access to the Protected Resource 110(*a-c*), the Access Gate Access Gate 108(*a-c*) may be notified of the level of access that should be granted.

In some embodiments, a certificate, such as a digital certificate, is sent to the Access Gate Access Gate 108(*a-c*). The certificate allows the User 106 to access the Protected Resource 110(*a-c*) for a period of time. In some embodiments the certificate may expire after a pre-determined period of time. Upon arrival of the expiration time, the Access Gate 108(*a-c*) may communicate with the Access Manager 112 to renew the certificate for an additional period of time, thus allowing the User 106 to continue to access the Protected Resource 110(*a-c*).

In typical operation, the Identity Manager 102 will be used to define access privileges to Protected Resources 110(*a-c*) for all Users 106. These privileges will be stored in the User Data Repository 104. An attempt by a User 106 to access a Protected Resource 110(*a-c*) will be intercepted by the Access Gate 108(*a-c*). The Access Gate 108(*a-c*) then communicates with the Access Manager 112, indicating the resource being access, the User 106 attempting access, and optionally User 106 authentication information, such as a password. The Access Manager 112 then queries the User Data Repository 104 to determine if access to the Protected Resource 110(*a-c*) should be granted to the User 106.

If access is to be granted, the Access Manager 112 may issue a certificate, such as a digital certificate, to the Access Gate 108(*a-c*) which indicates that the User 106 should be given access to the Protected Resource 110(*a-c*) for a defined period of time. The User 106 is then allowed to access the Protected Resource 110(*a-c*). Upon expiration of the certificate, the Access Gate 108(*a-c*) can again communicate with the Access Manager 112 to determine if the User 106 should still be granted access. If access is still allowed, a new or renewed certificate may be issued, and the User 106 can continue to access the Protected Resource 110(*a-c*).

It is possible that after a certificate has been issued by the Access Manager 112, but prior to the expiration of the certificate, the Identity Manager 102 changes the privileges granted to a User 106 accessing a Protected Resource 110(*a-c*). The level of access granted may be increased or decreased, possibly to the extreme of prohibiting access. In prior systems and as explained further with respect to FIG. 2(*a*), this is problematic because the certificate granted to the User 106 no longer reflects the User's 106 currently granted privileges. In prior systems, absent an explicit notification from the identity management system, it is not until the certificate expires and is again verified by the Access Gate 108(*a-c*) that the change in privileges is noted.

Embodiments of the present invention advantageously overcome this problem through the use of a back channel established between the User Data Repository 104 and the Access Manager 112. Upon any change to the User Data Repository 104 that affects a User 106, the repository itself will indicate such a change to the Access Manager 112. The Access Manager 112 may then query the User Data Repository 104 again in order to determine the correct set of privileges to be granted to the User 106. The Access Manager 112 will then update the Access Gate 108(*a-c*) with the new privileges. Advantageously, this update can occur substantially in real time. In this case, substantially real time means that it is not necessary to wait for the certificate that was initially issued to expire, but rather the process of issuing a new certificate can being as soon as the Access Manager 112 is notified of the change to the User Data Repository 104.

Embodiments of the present invention advantageously do not rely on the Identity Manager 102 to notify the Access Manager 112 of changes to the User Data Repository 104. As mentioned above, different vendors may provide the Identity 102 and the Access 112 Manager solutions. Therefore, there is no way to ensure that these products will communicate with each other properly. Embodiments of the present invention advantageously make use of the ability present in most modern data repositories to execute code upon changes to data stored within the repository. The code can advantageously be used to notify the Access Manager 112 of data changes within the data repository. Thus the Access Manager 112 is advantageously no longer dependent on the Identity Manager 102 providing notifications of changes to User's 106 privileges.

Figure 2A:
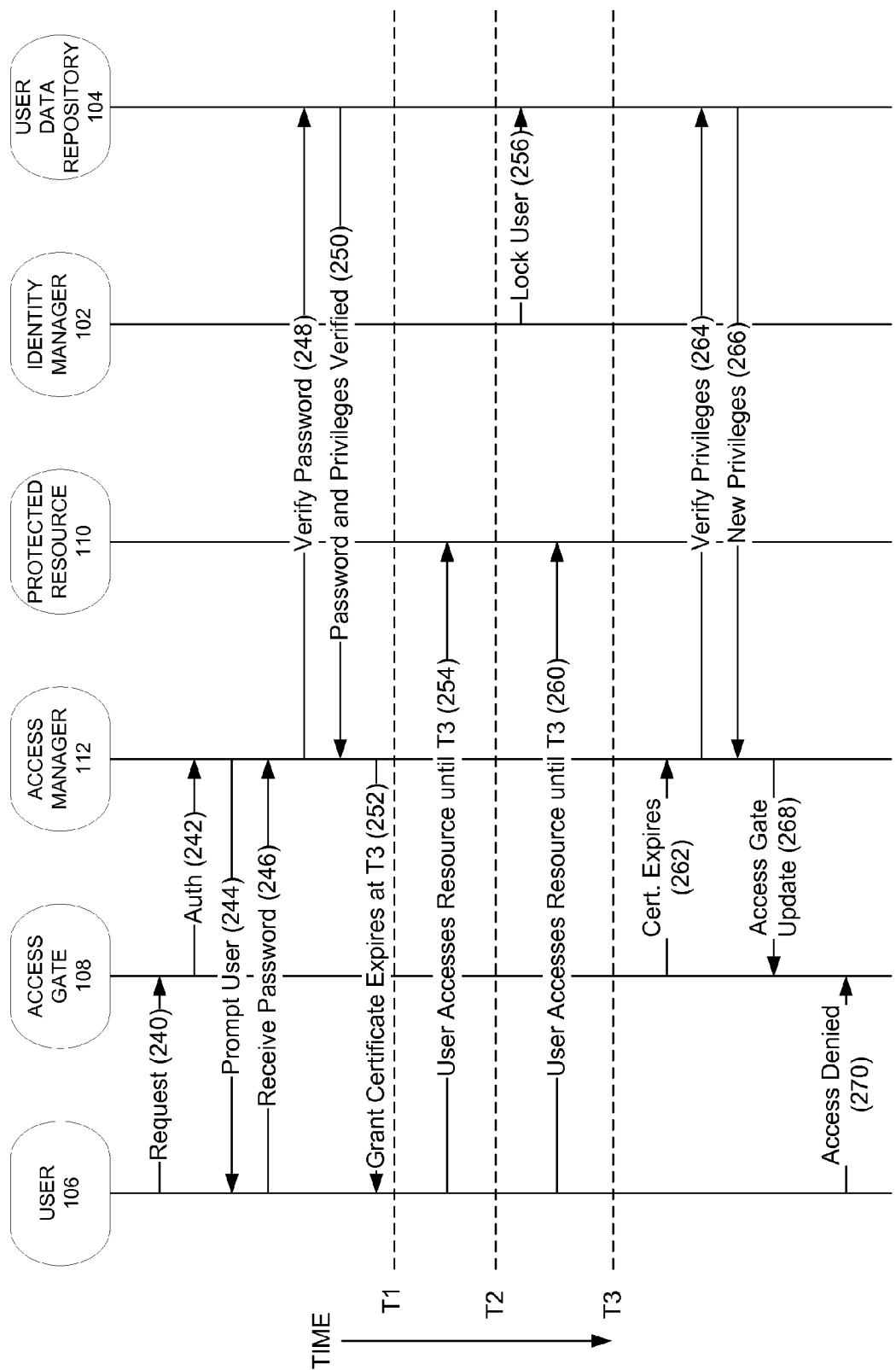
FIGS. 2(*a-c*) are simplified timing sequence diagram depicting operations of embodiments of the present invention.
Figure 2B:
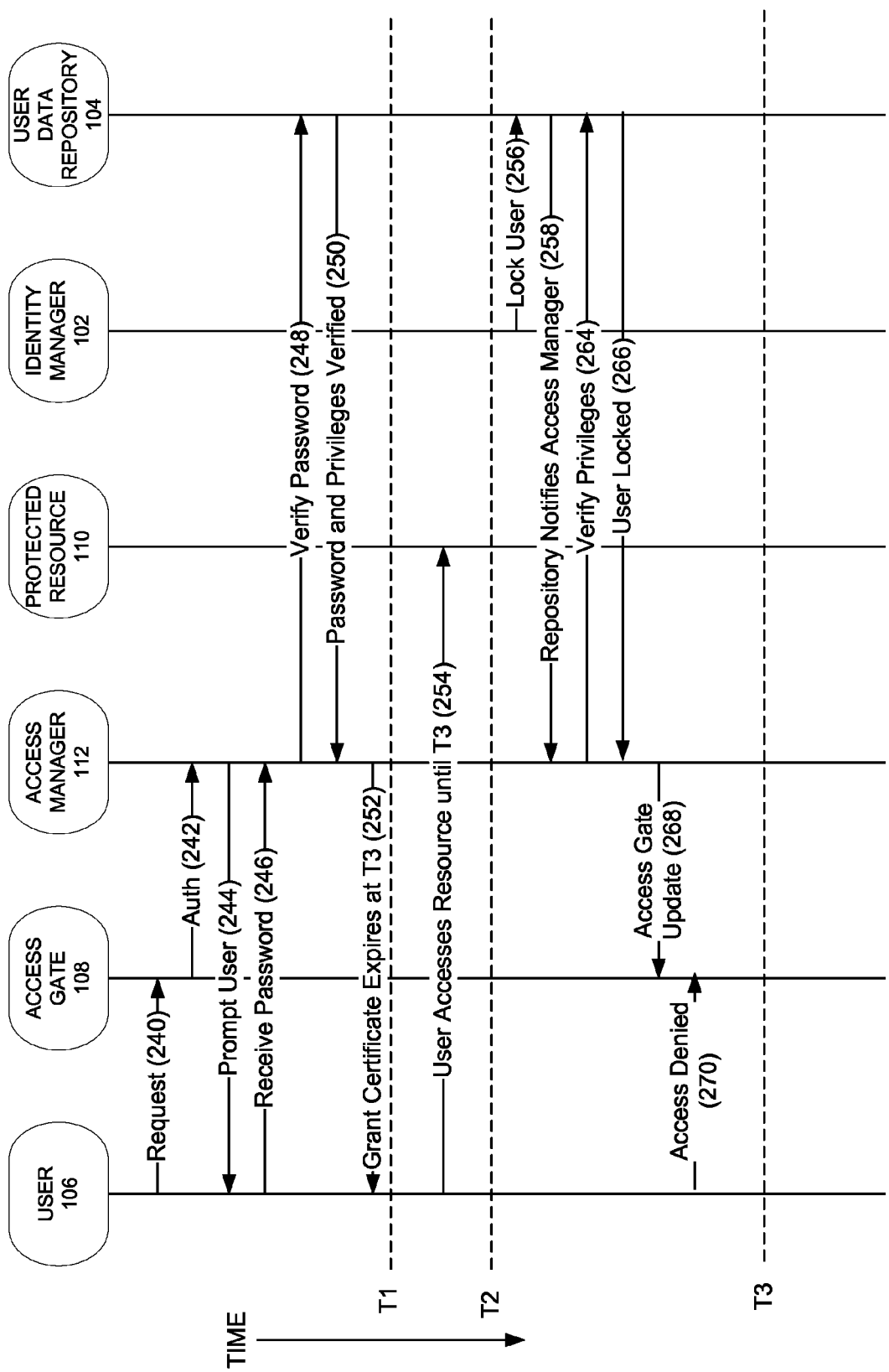
Figure 2C:
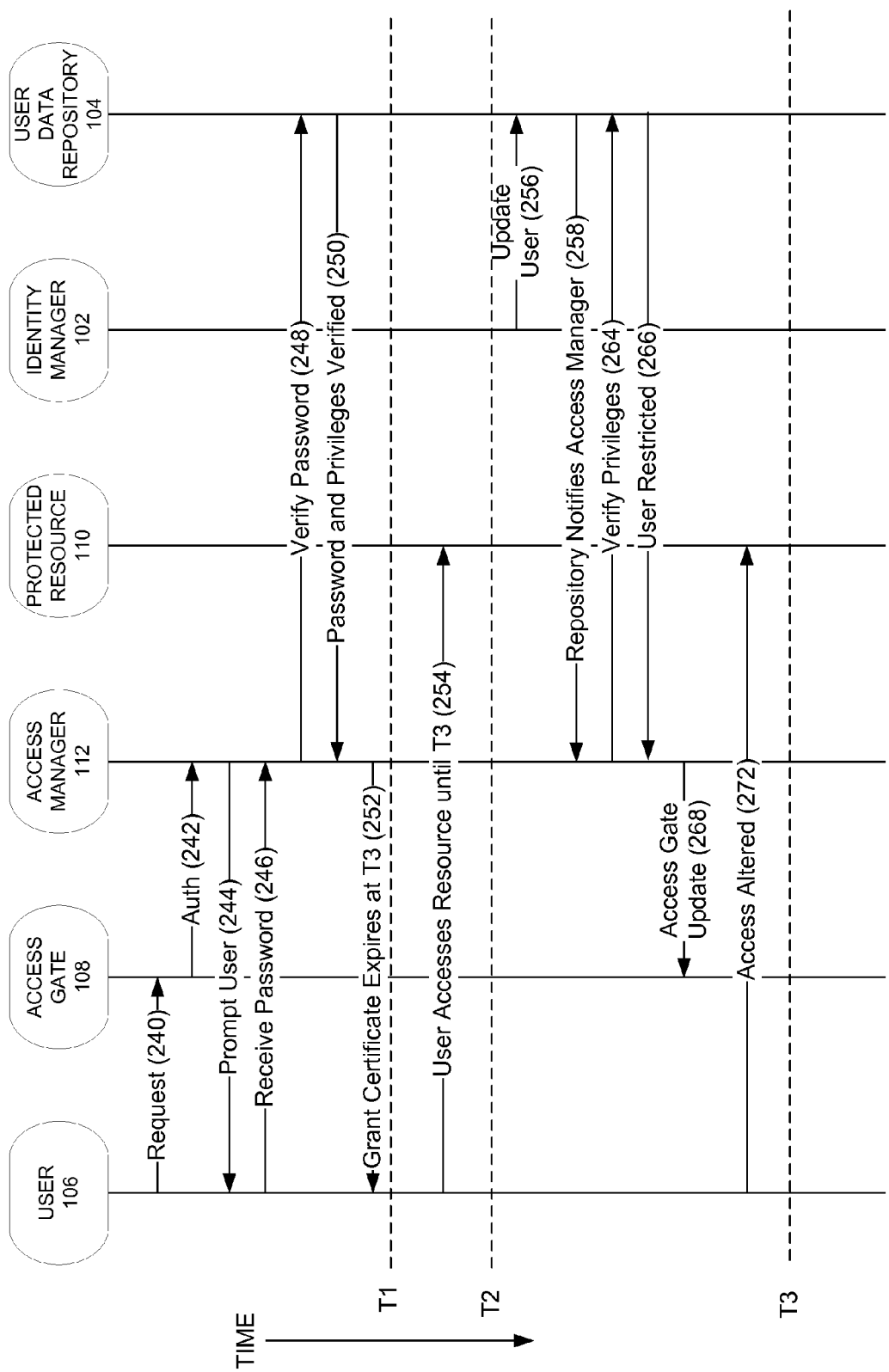

FIGS. 2(*a-c*) are simplified timing sequence diagram depicting operations of embodiments of the present invention. FIG. 2(*a*) depicts a timing sequence diagram of a User 106 attempting to access a Protected Resource 110 as would occur in the prior art. In this exemplary timing sequence, the User's 106 access privileges to the Protected Resource 110 have already been populated in the User Data Repository 104 by the Identity Manager 102. The process begins with User 106 attempting to access the Protected Resource 110. The access attempt is intercepted 240 by the Access Gate 108. The Access Gate 108 may then send an authorization request 242 to the Access Manager 112 to establish the permitted level of access of the User 106 to the Protected Resource 110.

In some embodiments, the Access Manager 112 may prompt 244 the User 106 to authenticate themselves. This request can be in any number of forms, the simplest being a request for a password. Other authentication schemes, such as those based on biometrics or secure tokens may also be used. The Access Manager 112 is simply attempting to authenticate that User 106 is actually who he claims to be, and is not an imposter. The User 106 may then send his password 246 or other authentication credentials to the Access Manager 112. The Access Manager 112 may proceed to verify the User's 106 credentials via a communication, such as a query, to the User Data Repository 104. For example, the users password can be sent 248 to the User Data Repository 104.

The User Data Repository 104 may then respond 250 to the Access Manager 112 with the privileges that have been granted to the User 106. In some embodiments, the User Data Repository 104 may return the roles assigned to the User 106 and it is left to the Access Manager 112 to determine the privileges that are granted. In other embodiments, the User Data Repository 104 itself may determine the privileges granted. The Access Manager 112 may then grant 252 the User 106 a certificate. The certificate may include the privileges granted to the User 106 and an expiration time of the certificate. In the present example, the certificate may be granted at a time referred to as T1 and may expire at a time T3, which is later than T1. Between time T1 and T2, the User 106 may access 254 the Protected Resource 110.

At a time T2, which is prior to T3, the Identity Manager 102 may determine that it is necessary to lock 256 the User 106. This can be for any number of reasons, such as the User 106 is being terminated. As should be clear, the User 106 is still allowed access 260 to the Protected Resource 110. This is because the certificate granted 252 to the User 106 does not expire until time T3. Unless the Identity Manager 102 explicitly informs the Access Manager 112 of a change in the access privileges of the User 106, the Access Manager 112 is unaware that the User 106 should be locked. Herein lies the problem with prior art systems. As mentioned above, because the Access Manager 112 and the Identity Manager 102 may be provided by different vendors, there is no way to enforce proper communication between the systems.

The User 106 is permitted to continue access 260 to the Protected Resource 110 until time T3, when the certificate granted at step 252 expires. The Access Manager 112 may then attempt to verify the privileges 264 of the User 106 again. At this point, the User Data Repository 104 may respond 266 with the new privileges of User 106, which in this case indicate the User 106 has been locked. The Access Manager 112 may then update 268 the Access Gate 108 to indicate that the User 106 is now locked. The Access Gate 108 then denies 270 the User 106 access to the Protected Resource 110. As should be clear, this is a non-ideal situation in that for the time period between T2 and T3, the User 106 is allowed to access a Protected Resource 110 that he should no longer be allowed to access.

FIG. 2(*b*) depicts a timing sequence diagram of a User 106 attempting to access a Protected Resource 110 according to an embodiment of the present invention. The sequence proceeds as described in FIG. 2(*a*) through step 256, wherein the User 106 is locked by the Identity Manager 102. At this point, the User Data Repository 104 receives the changes from the Identity Manager 102, and sends a notification 258 to the Access Manager 112. As explained above, in some embodiments, the notification is sent via a trigger within the User Data Repository 104 activating. In other embodiments, the notification 258 is sent as part of an LDAP persistent query.

In some embodiments, the notification 258 may include the updated privileges that have been granted to the User 106, which in this example indicate the User 106 has been locked. In other embodiments, the notification may simply notify the Access Manager 112 that some piece of data related to the User 106 has changed. In embodiments where the Access Manager 112 is only notified of a change to the User 106, the Access Manager 112 may again query 264 the User Data Repository 104 to determine the current set of granted privileges. The User Data Repository 104 will respond 266 with the new set of privileges. The query 264/response 266 sequence is essentially the same as steps 248 and 250, except that the user credentials may not need to be verified. This is because the User 106 has already been verified to be who he claims to be, the changes that may be occurring only relate to the privileges granted to the User 106.

The Access Manager 112 may then determine the new set of privileges that should be granted to the User 106, which in this example is a complete lock of the User 106, eliminating all privileges. The Access Manager 112 may then update 268 the Access Gate 108 to indicate the User 106 is now locked. At this point any further attempt by the User 106 to access the Protected Resource 110 is denied 270. As should be clear from FIG. 2(*b*), the User 106 is denied access to the Protected Resource 110 before the certificate granted in step 252 expires at time T3. Embodiments of the present invention advantageously are able to modify a User's 106 access privileges as soon as modifications are made, without relying on the expiration of a previously granted certificate.

It should also be noted that the notification 258 of a change to the User 106 is initiated by the User Data Repository 104, not the Identity Manager 102. Initiating notification 258 from the User Data Repository 104 advantageously eliminates the necessity of the Identity Manager 102 to directly communicate with the Access Manager 112. As explained above, these two entities may be provided by different vendors, and there is no way to enforce proper communication between them.

Furthermore, embodiments of the invention advantageously make use of notification facilities that are currently available in almost all commercially available data stores. The ability to establish triggers within a database or LDAP persistent queries within a directory server are known within the field of data stores. Even if the User Data Repository 104 is supplied by a different vendor than the Access Manager 112, it is inconsequential. Embodiments of the invention rely on known notification features of the User Data Repository 104 to establish a back channel with the Access Manager 112, not on a vendor specific configuration between the Identity Manager 102 and the Access Manager 112. Because the organization that is utilizing embodiments of the invention makes use of existing features of the User Data Repository 104, there is no need to coordinate between the vendors of the various elements.

Although FIG. 2(*b*) has been described in terms of a notification being sent upon a change to an individual User's 106 access privileges, embodiments of the invention are not so limited. In some embodiments, the Access Manager 112 may simply be sent a notification when there is a change to any data element associated with any User 106 in the entire User Data Repository 104, regardless of if that change affects any access privileges. The Access Manager 112 would then be responsible for determining if any certificates have been granted and repeating steps 264 and 268 for all such Users 106. In such an embodiment, there is a tradeoff wherein, the implementation of the User Data Repository 104 becomes easier, as there is no need to monitor individual user records, while implementation of the Access Manager 112 becomes more complex, as the Access Manager 112 must reprocess all Users 106, even if there were no changes to the majority of Users 106.

In some embodiments of the invention, step 268 may not update the Access Gate 108 with the new user access privileges, but rather may flush a cache on the Access Gate 108 that contains the access privileges of the User 106. Thus, when the User 106 attempts to access the Protected Resource 110, the Access Gate 108 will have no record of the User 106 having been granted access to the Protected Resource 110. A substantially real-time membership calculation and enforcement for a user whose data is modified in the user data repository can be achieved. The Access Gate 108 will then return to step 242, wherein authorization to access the Protected Resource 110 is requested. As should be clear, access to the Protected Resource 110 will not be granted because the privileges calculated in step 250 will indicate the User 106 has no access privileges.

In some embodiments of the invention, upon the locking of a User 106 in step 266, the Access Manager 112 may add the User 106 to an invalid users list. The Access Gate 108 may check this list upon every access by the User 106 to a Protected Resource 110. If a User 106 appears on the invalid user's list, access to the Protected Resource 110 will be denied.

FIG. 2(*c*) depicts a timing sequence diagram of a User 106 attempting to access a Protected Resource 110 according to an alternate embodiment of the present invention. The sequence in FIG. 2(*c*) is essentially the same as that in FIG. 2(*b*) up until step 256. In step 256 of FIG. 2(*c*), rather than the User 106 being locked, the User 106 may be updated to have privileges that are different than those granted in step 252. The level of access granted may be increased or decreased. At step 264, the Access Manager 112 again interacts with the User Data Repository 104 to retrieve the updated privileges, which as indicated in this example show that the User 106 is being restricted. The Access Gate 108 can then be updated 268 with the User's 106 new restricted privileges. The User 106 then continues to access 272 the Protected Resource 110, albeit with the restricted set of privileges. Just as above, embodiments of the present invention advantageously do no rely on the certificate granted at step 252 to expire before updating the User's 106 privileges.

Figure 3:
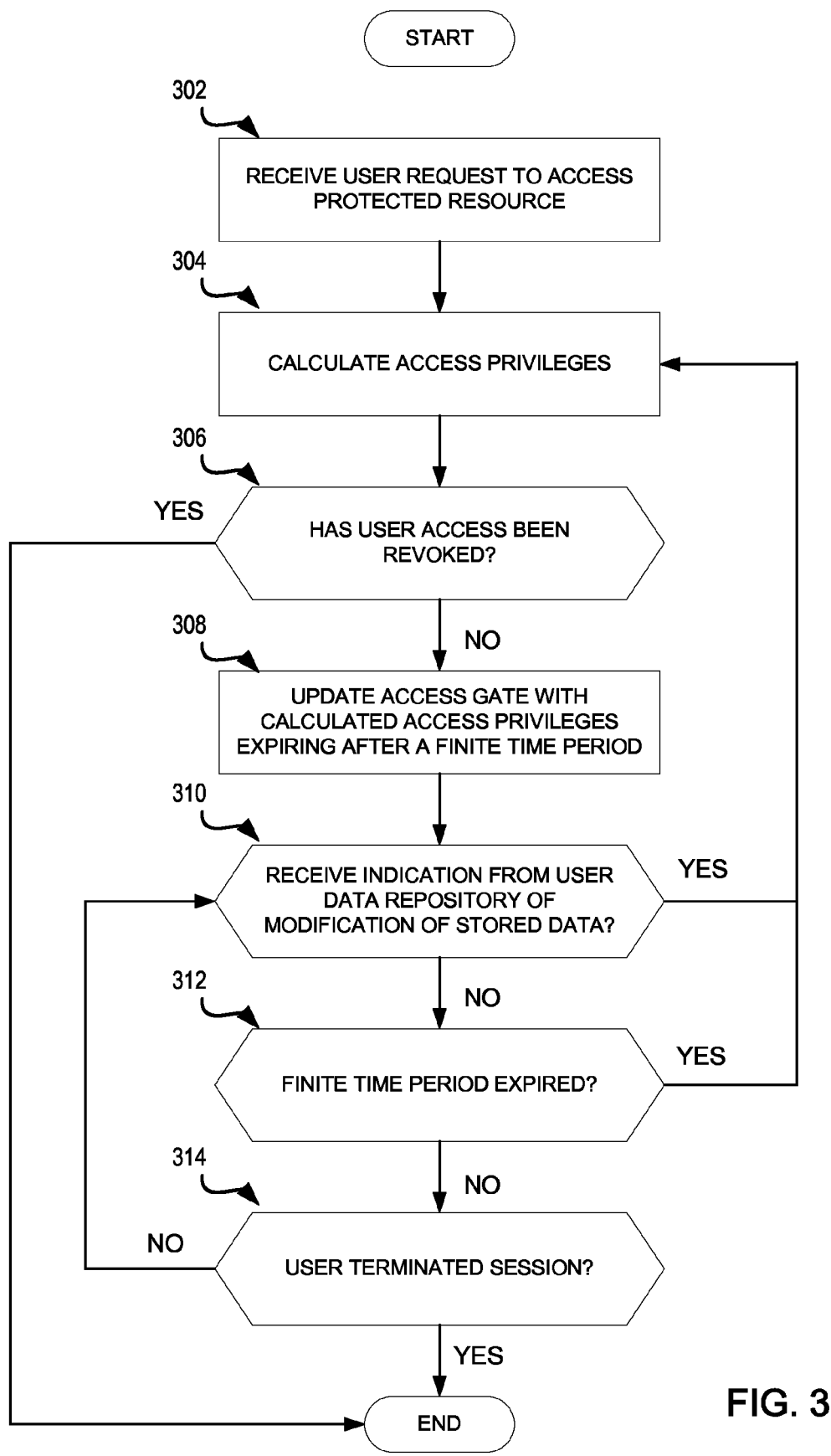
FIG. 3 is a simplified flow diagram indicating operation of an embodiment of the invention.

FIG. 3 is a simplified flow diagram indicating operation of an embodiment of the invention from an access manager perspective. The process may begin at step 302 wherein a request form a user to access a protected resource is received. The process then moves to step 304, wherein access privileges for the user are calculated. As explained above, the process of calculating the access privileges that have been granted to a user can include querying a user data repository. From the data stored in the user data repository, such as roles assigned to the user and privileges assigned either directly to the user or to roles associated with the user, the access privileges of the user can be determined. The process then continues on to step 306 where it is determined if the user's access privileges have been revoked. If so, there is no need to continue as the user has no privileges to access the protected resource. The process then ends.

If the user's access privileges have not been revoked, the process continues on to step 308, wherein the access gate associated with the protected resource is updated with the calculated access privileges. The access privileges may expire after a finite period of time. At this point, the user has been granted access to the protected resource.

The process may then begin a loop that starts at step 310, wherein an indication of a modification of data stored in the user data repository may be received. If no indication of a modification of the data stored in the user data repository is received, the process may continue on to step 312 wherein it is determined if the finite time period established in step 308 has expired. If the finite time period is not expired, the process continues on to step 314, where it is determined if the user has terminated the session which began at step 302 with the request for access to the protected resource. If the user has terminated his session, the process ends. If the user has not terminated his session, the process loops back to step 310 and repeats.

If at step 310, an indication of modification of data stored in the user data repository is received, the process returns to step 304. The user data repository is queried again to calculate the latest set of privileges granted to the user. Similarly, if at step 312, the finite time period established in step 308 has expired, the process again returns to step 304 to calculate the latest set of privileges granted to the user. As should be clear, the process in FIG. 3, steps 310, 312, and 314, form a loop. As soon as any event occurs, such as expiration of the finite time period or an update to the user data repository, the user's access privileges are immediately recalculated.

Figure 4:
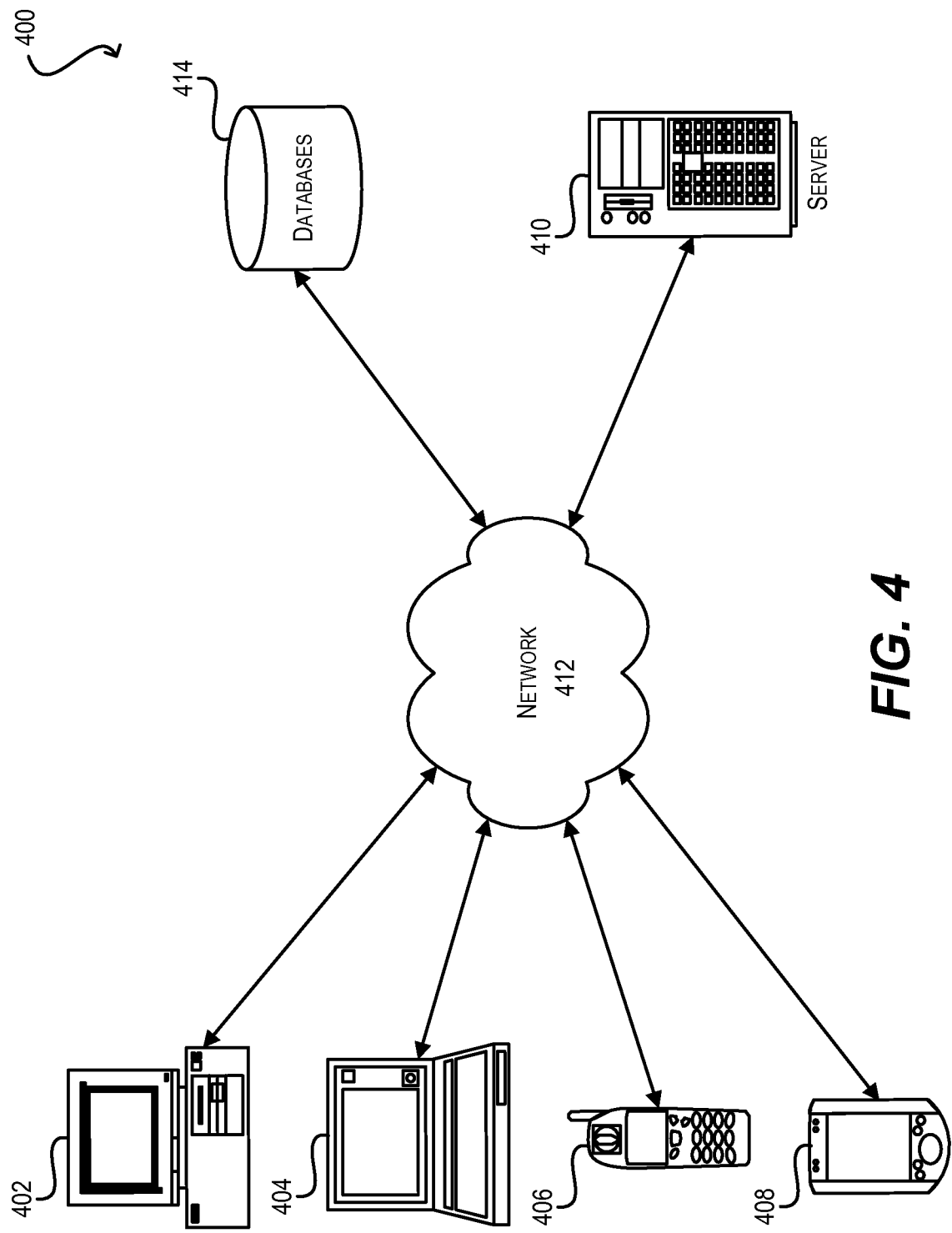
FIG. 4 is a simplified block diagram illustrating the physical components of a system environment 400 that may be used in accordance with an embodiment of the present invention.

FIG. 4 is a simplified block diagram illustrating the physical components of a system environment 400 that may be used in accordance with an embodiment of the present invention. This diagram is merely an example, which should not unduly limit the scope of the claims. One of ordinary skill in the art would recognize many variations, alternatives, and modifications.

As shown, system environment 400 includes one or more client computing devices 402, 404, 406, 408 communicatively coupled with a server computer 410 via a network 412. In one set of embodiments, client computing devices 402, 404, 406, 408 may request service from the server computer 410. For example, each of the client computing devices may be accessing a protected resource operating on server computer 410.

Client computing devices 402, 404, 406, 408 may be general purpose personal computers (including, for example, personal computers and/or laptop computers running various versions of Microsoft Windows™ and/or Apple Macintosh™ operating systems), cell phones or PDAs (running software such as Microsoft Windows Mobile™ and being Internet, e-mail, SMS, Blackberry™, and/or other communication protocol enabled), and/or workstation computers running any of a variety of commercially-available UNIX™ or UNIX™-like operating systems (including without limitation the variety of GNU/Linux™ operating systems). Alternatively, client computing devices 402, 404, 406, and 408 may be any other electronic devices capable of communicating over a network (e.g., network 412 described below) with server computer 410. Although system environment 400 is shown with four client computing devices and one server computer, any number of client computing devices and server computers may be supported. For example, users may request initiating and/or terminating user threads and/or contexts using the client computer devices.

Server computer 410 may be a general purpose computer, specialized server computer (including, e.g., a LINUX™ server, UNIX™ server, mid-range server, mainframe computer, rack-mounted server, etc.), server farm, server cluster, or any other appropriate arrangement and/or combination. Server computer 410 may run an operating system including any of those discussed above, as well as any commercially available server operating system. Server computer 410 may also run any variety of server applications and/or mid-tier applications, including web servers, Java™ virtual machines, application servers, database servers, and the like. In various embodiments, server computer 410 is adapted to run one or more Web services or software applications described in the foregoing disclosure. For example, server computer 410 may run access manager, access gate, or identity manager applications. In an embodiment, the server computer comprises different computers, each configured to run an application providing the functionality of one of an access manager, an access gate, and identity manager, or a protected resource.

As shown, client computing devices 402, 404, 406, 408 and server computer 410 are communicatively coupled via network 412. Network 412 may be any type of network that can support data communications using any variety of commercially-available protocols, including without limitation TCP/IP, SNA, IPX, AppleTalk™, and the like. Merely by way of example, network 412 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infrared network; a wireless network (e.g., a network operating under any of the IEEE 802.11 suite of protocols, the Bluetooth™ protocol known in the art, and/or any other wireless protocols); and/or any combination of these and/or other networks. In various embodiments, the client computing devices 402, 404, 406, 408 and server computer 410 are able to access the database 414 through the network 412. In certain embodiments, the client computing devices 402, 404, 406, 408 and server computer 410 each has its own database.

System environment 400 may also include one or more databases 414. In an embodiment, the databases may be a user repository, which stores the access privileges to protected resources of each user of the system. Database 414 may correspond to an instance of the user repository as well as any other type of database or data storage component described in this disclosure. Database 414 may reside in a variety of locations. By way of example, database 414 may reside on a storage medium local to (and/or residing in) one or more of the client computing devices 402, 404, 406, 408, 410. Alternatively, database 414 may be remote from any or all of the client computing devices 402, 404, 406, 408, 410 and/or in communication (e.g., via network 412) with one or more of these. In one set of embodiments, database 414 may reside in a storage-area network (SAN) familiar to those skilled in the art. Similarly, any necessary files for performing the functions attributed to the client computing devices 402, 404, 406, 408, 410 may be stored locally on the respective computer and/or remotely on database 414, as appropriate.

Figure 5:
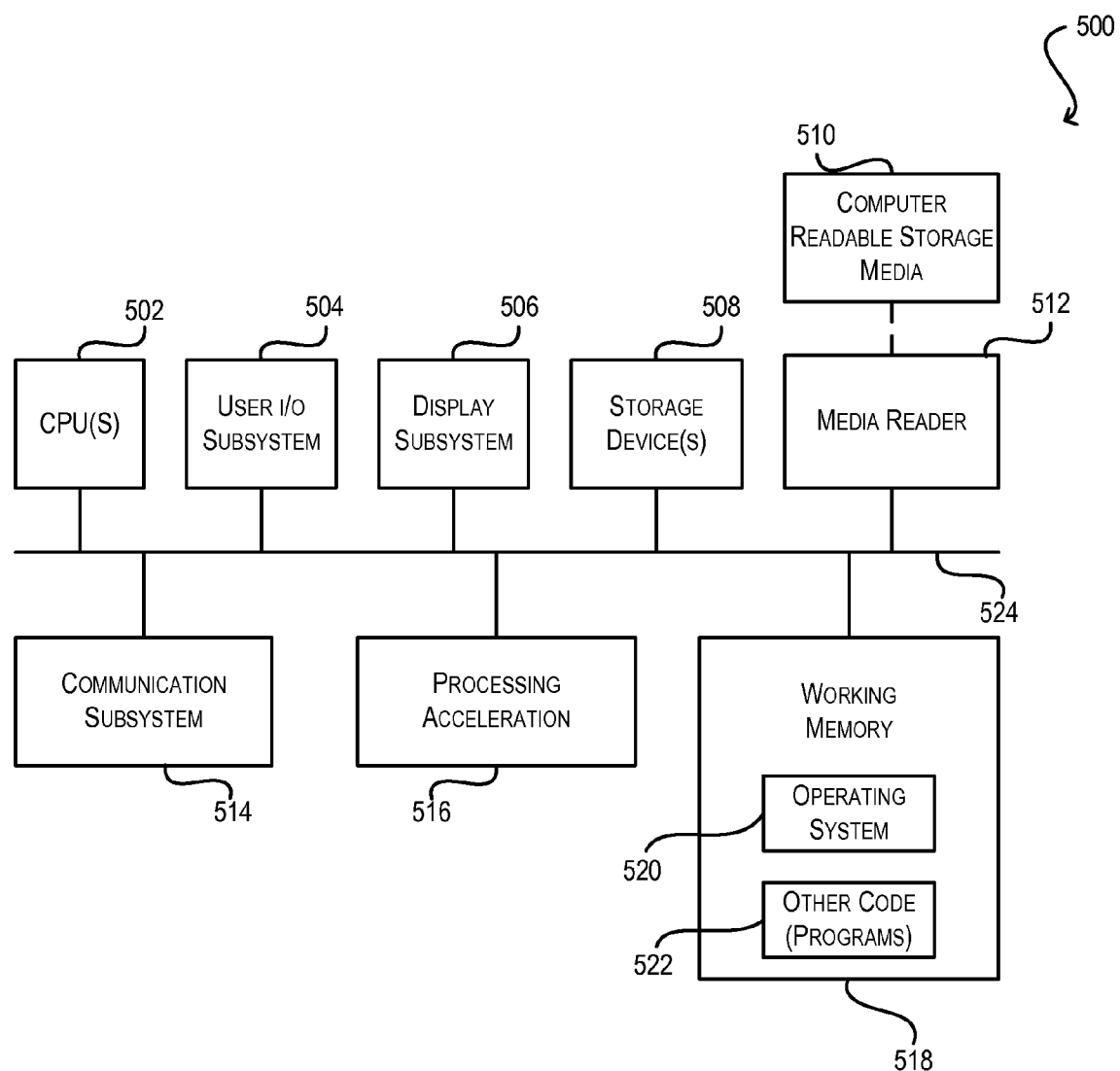
FIG. 5 is a simplified block diagram illustrating the physical components of a computer system 500 that may be used in accordance with an embodiment of the present invention.

FIG. 5 is a simplified block diagram illustrating physical components of a computer system 500 that may be used in accordance with an embodiment of the present invention. This diagram is merely an example, which should not unduly limit the scope of the claims. One of ordinary skill in the art would recognize many variations, alternatives, and modifications.

In various embodiments, computer system 500 may be used to implement any of the computing devices 402, 404, 406, 408, 410 illustrated in system environment 400 described above. As shown in FIG. 5, computer system 500 comprises hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). For example, the input device 504 is used to receive user inputs. Computer system 500 may also include one or more storage devices 508. By way of example, storage devices 508 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage device 508. For example, the central processing unit 502 is configured to process user access privileges. In addition, a user may use computer system 500 to access protected resources. Computer system 500 may also be configured to act as one or more of an access manager, an access gate, and identity manager, or a protected resource.

Computer system 500 may additionally include a non-transitory computer-readable storage media reader 512, a communications subsystem 514 (e.g., a modem, a network card (wireless or wired), an infrared communication device, etc.), and working memory 518, which may include RAM and ROM devices as described above. In some embodiments, computer system 500 may also include a processing acceleration unit 516, which can include a digital signal processor (DSP), a special-purpose processor, and/or the like.

Non-transitory computer-readable storage media reader 512 can further be connected to non-transitory computer-readable storage media 510, together (and, optionally, in combination with storage devices 508) comprehensively representing remote, local, fixed, and/or removable storage devices plus storage media for temporarily and/or more permanently containing computer-readable information. Communication subsystem 514 may permit data to be exchanged with network 412 of FIG. 4 and/or any other computer described above with respect to system environment 400.

Computer system 500 may also comprise software elements, shown as being currently located within working memory 518, including an operating system 520 and/or other code 522, such as an application program (which may be a client application, Web browser, mid-tier application, RDBMS, etc.). In a particular embodiment, working memory 518 may include executable codes and associated data structures for one or more of the design-time or runtime components/services illustrated in FIGS. 1-3. It should be appreciated that alternative embodiments of computer system 500 may have numerous variations from that described above. For example, customized hardware might also be used and/or particular elements might be implemented in hardware, software (including portable software, such as Applets™), or both. Further, connection to other computing devices such as network input/output devices may be employed. In various embodiments, the behavior of the systems described throughout the present application is implemented as software elements of the computer system 500.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method of managing user access to protected computer resources, the method comprising:
    establishing, by a computer, a backchannel to a user data repository provided by a relational database;
    calculating, by the computer, access privileges to at least one of said protected computer resources based on a user record stored in the user data repository provided by the relational database;
    causing, by the computer, an access gate that protects at least one of said protected computer resources to store said access privileges in local storage;
    receiving, at the computer, a notification using the backchannel that is generated by a notification mechanism of said user data repository implementing data update code executed on said relational database, said data update code triggered directly in response to a modification of said user record stored in said user data repository;
    querying, by the computer, the user data repository in response to the notification to obtain the modification of said user record;
    calculating, by the computer, updated access privileges to the at least one of said protected computer resources using said obtained modification of said user record; and
    causing, by the computer, the access gate associated with the at least one of said protected computer resources to update its local storage with said updated access privileges in response to pushing said updated access privileges to said access gate.

2. The method of claim 1 wherein the modification of said user record comprises a change in an assigned role of a user.

3. The method of claim 2 wherein calculating updated access privileges includes calculating updated privileges based on the user's assigned role.

4. The method of claim 3 wherein updated privileges can include denying access to the at least one of said protected computer resources.

5. The method of claim 1 wherein said notification mechanism comprises a stored procedure implemented in said relational database.

6. The method of claim 5 wherein the stored procedure is specified per user record.

7. The method of claim 1 wherein said notification mechanism comprises an LDAP persistent query.

8. The method of claim 1 wherein updated access privileges are calculated for all users upon any modification of said user data repository.

9. The method of claim 1 wherein updated access privileges are calculated only for users whose data is modified in said user data repository.

10. The method of claim 1, further comprising substantially real-time membership calculation and enforcement for a user whose data is modified in said user data repository.

11. The method of claim 1, further comprising adding a user whose access to the at least one of said protected computer resources has been locked to an invalid users list, wherein said list is verified upon every access to the protected resource.

12. The method of claim 1, further comprising receiving an indication from an identity management application of a change in data stored in the user data repository.

13. The method of claim 1, wherein receiving the notification comprises receiving an indication of a change in data associated with said user record.

14. A non-transitory computer readable medium embodying thereon a set of instructions which when executed by a computer cause the computer to manage user access to protected computer resources, the non-transitory computer readable medium comprising:
    code for establishing a backchannel to a user data repository provided by a relational database;
    code for calculating access privileges to at least one of said protected computer resources based on a user record stored in the user data repository provided by the relational database;
    code for causing an access gate that protects at least one of said protected computer resources to store said access privileges in local storage;
    code for receiving an indication using the backchannel that is generated by a notification mechanism of said user data repository implementing data update code executed on said relational database, said data update code triggered directly in response to a modification of said user record stored in said user data repository;
    code for querying the user data repository in response to the notification to obtain the modification of said user record;
    code for calculating updated access privileges to the at least one of said protected computer resources using said obtained modification of said user record; and
    code for causing the access gate associated with the at least one of said protected computer resources to update its local storage with said updated access privileges in response to pushing said updated access privileges to said access gate.

15. The non-transitory computer readable medium of claim 14 wherein the notification mechanism comprises a stored procedure implemented in said relational database.

16. The non-transitory computer readable medium of claim 14 wherein the notification mechanism comprises an LDAP persistent query.

17. The non-transitory computer readable medium of claim 14 wherein the code for receiving the indication comprises code for receiving a change in data associated with said user record.

18. A system for managing user access to protected computer resources, the system comprising:
 a processor; and
 a memory coupled to said processor, the memory including a set of instructions which when executed by the processor configure the processor to:
 establish a backchannel to a user data repository provided by a relational database;
 calculate access privileges to at least one of said protected computer resources based on a user record stored in the user data repository provided by the relational database;
 cause an access gate that protects at least one of said protected computer resources to store said access privileges in local storage;
 receive a notification using the backchannel that is generated by a notification mechanism of said user data repository implementing data update code executed on said relational database, said data update code triggered directly in response to a modification of said user record stored in said user data repository;
 query the user data repository in response to the notification to obtain the modification of said user record;
 calculate updated access privileges to the at least one of said protected computer resources using said obtained modification of said user record obtained via the query; and
 cause the access gate associated with the at least one of said protected computer resources to update its local storage with said updated access privileges in response to pushing said updated access privileges to said access gate.

19. The system of claim 18 wherein the notification mechanism comprises a stored procedure implemented in said relational database.

20. The system of claim 18 wherein the notification mechanism comprises an LDAP persistent query.

* * * * *